June 20, 1944.  J. D. SEGUY  2,352,025
CONVERSION OF HYDROCARBON OILS
Filed Aug. 15, 1940
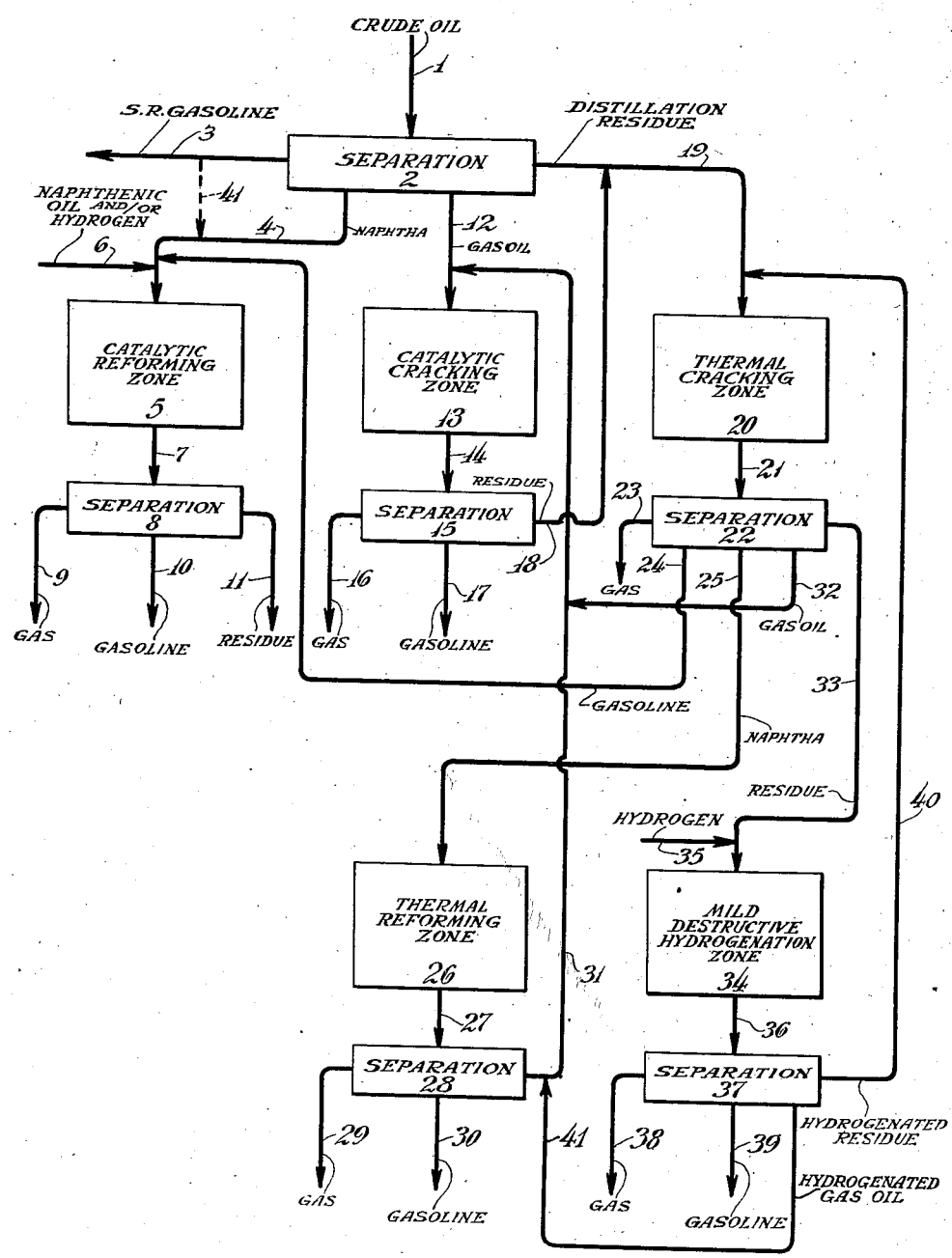
INVENTOR.
BY Jean Delattre Seguy Patented June 20, 1944

2,352,025

UNITED STATES PATENT OFFICE 2,352,025

CONVERSION OF HYDROCARBON OILS

Jean Delattre Seguy, Chicago, Ill., assignor to Universal Oil Products Company, Chicago, Ill., a corporation of Delaware Application August 15, 1940, Serial No. 352,682

5 Claims. (Cl. 196—52)

This invention relates to an improved process for the production of high octane gasolines and other valuable products from wide boiling range hydrocarbon oil charging stock.

In this improved process the operations of catalytic reforming, catalytic cracking, thermal reforming, and thermal cracking are so interrelated as to produce optimum yields of aviation fuel as well as fuel for motor vehicles.

According to my invention a wide boiling range hydrocarbon oil, such as crude oil, is subjected to fractional distillation to separate straight run gasoline having a satisfactory octane number, a naphtha with relatively low octane number, the value depending somewhat upon the crude, a gas oil, and a liquid residue. A straight run gasoline with an end point of 300° F. may be withdrawn from the system as a product of the process and used as a base for an aviation fuel. The naphtha fraction with a boiling range of the order of 300–500° F. is subjected to a catalytic reforming process. This catalytic reforming process may be conducted in the presence of a hydrogen donor, such as a naphthenic oil, or preferably in the presence of hydrogen-containing gases. These hydrogen-containing gases may be the process gases formed in the catalytic reforming step itself. A low end point gasoline formed in a thermal cracking step of the process may be used as part of the charge for the catalytic reforming step. A 300–350° F. end point gasoline obtained in the thermal cracking step contains a high proportion of iso-olefins which become saturated in the catalytic reforming step in the presence of a hydrogen-donor, such as hydrogen itself. The gasolines formed in the catalytic reforming step in the presence of the hydrogen donor are characterized by low bromine number and relatively high octane number; this latter value may be of the order of 75 or 76 by the C. F. R. motor method.

Typical catalysts used in the reforming operation comprise relatively inert supports such as alumina or magnesia with more active constituents, such as the compounds and preferably the oxides of the left-hand columns of groups IV, V, and VI of the periodic table. This catalytic reforming process may be conducted with a slurried catalyst or with a fixed-bed catalyst. Temperatures used in this step lie within the approximate range of 900–1100° F. when using the preferred catalysts. Pressures of the order of atmospheric to 50 pounds per square inch gauge are used in catalytic reforming without hydrogen donors. Pressures of the order of 50 to several hundred pounds per square inch are used in the catalytic reforming process with hydrogen-containing gases or naphthenic oils. While the above catalysts are the preferred ones for use in this process, my invention is not to be construed as to be limited to these. Other catalysts known to the art as being effective in promoting the cyclization of chain compounds to ring compounds, and in promoting the addition or transfer of hydrogen may be used in my process.

The virgin gas oil obtained by distillation of the crude and which may have a boiling point of the approximate range of 450–750° F. is subjected to a catalytic cracking step. This virgin gas oil is commingled with a recycle fraction of the same order of volatility produced in the thermal cracking step of the system. A small proportion of heavy bottoms produced in a subsequent thermal reforming step may also form part of the combined feed for the catalytic cracking step. The catalytic cracking step may be conducted with catalysts supplied in slurry form or, if desired, a fixed-bed catalyst. The preferred catalysts comprise composites of the type of silica-alumina, silica-zirconia, and silica-alumina-zirconia. These catalysts may comprise natural products, preferably after preliminary purification, but more preferably a synthetic type prepared by chemical precipitation. The temperatures used in this catalytic cracking step are of the order of 800–1200° F. when using a fixed-bed catalyst. When using a slurried catalyst, the lower range may be somewhat extended. When using a fixed-bed catalyst, pressures may be varied from atmospheric to 200 or 300 pounds per square inch. Approximately the same range of pressures may be used when using a slurry type catalyst, although it may sometimes be desired in this case to extend the upper range to as much as 500 pounds per square inch. The products from the catalytic cracking step are separated into normally gaseous products, catalytically cracked gasoline and a higher boiling liquid. The catalytic cracking step may operate on a once-through basis but more preferably on a recycle basis, a portion of the unconverted products present after they pass over the catalyst being returned to the catalytic cracking step.

The catalysts used in both the reforming operation and the cracking step become coated with carbonaceous deposits and their regeneration is necessary. In using a fixed-bed catalyst, it is desirable to have two or more reactors operating in parallel in order that the operation may be continuous, one or more reactors being "on stream" while the catalyst in the others is undergoing regeneration. Regeneration of the spent catalyst is commonly accomplished by oxidation using a gas containing a small quantity of molecular oxygen. Slurry type catalysts may also be regenerated by oxidation using gas containing a limited quantity of oxygen.

The higher boiling liquid residue removed from the catalytic cracking system having a boiling point of the approximate range of the virgin gas oil is commingled with residue obtained from the distillation of the raw oil charging stock. This mixture of topped crude and catalytically cracked gas oil may be commingled with a minor quantity of liquid hydrocarbons obtained from the coking step in the system. The distillation residue diluted in the manner described constitutes the charging stock for the thermal cracking step. The thermal cracking step is preferably of the mixed-phase type and may employ either one-coil or two-coil method of operation. The temperature employed in the thermal cracking step may vary at the outlet of the heating coil from 900–1100° F. when employing a pressure of the order of 200–1000 pounds per square inch. The reaction chamber following the heating coils is preferably operated at a substantially superatmospheric pressure of the order of 100–500 pounds per square inch. The fractionating columns and collecting portions of the thermal cracking system may employ pressures of the order of 100 pounds per square inch. The 300–350° F. end point gasoline separated from the thermal cracking step is directed to the catalytic reforming step as hereinbefore set forth. The naphtha fraction produced in catalytic cracking with a boiling range of approximately 300–500° F. is directed to a thermal reforming step.

The thermal reforming step is conducted at a temperature of the approximate range of 900–1050° F. and pressures of the approximate range of 500–1200 pounds per square inch. The products from the thermal reforming step are separated into normally gaseous products, a reformed gasoline, and heavy bottoms. The heavy bottoms may be supplied to the catalytic cracking step.

A distillate of the gas oil boiling range is separated from the products of the thermal cracking step and commingled with the gas oil obtained in the distillation of the charging stock and the mixture together with the heavy bottoms formed in the thermal reforming step is subjected to catalytic cracking.

The liquid residue obtained in the thermal cracking step is subjected to hydrogen-containing gases under conditions that might be described as those of mild destructive hydrogenation. Any conventional hydrogenation catalyst, such as nickel or molybdenum sulfide, may be employed in this hydrogenation step. The catalyst may be present in slurry form or as a fixed bed. Temperatures used in the hydrogenation step are of the order of 750–800° F. and pressures of the order of 1000 pounds per square inch. The effect of pressure is principally to vary the contact time, shorter times being required at the higher pressures. Hydrogen used in this step may be generated in a separate process. Hydrogen-containing gases formed in the catalytic dehydrocyclization or catalytic reforming step may be used to hydrogenate the liquid residue. The time of contact in the hydrogenation step is such that a minor amount of cracking takes place. The principal purpose of the hydrogenation being to hydrogenate the aromatic constituents of the oil and thus to render them more susceptible to thermal cracking. The gasoline formed in the hydrogenation step is removed by distillation and constitutes a product of the process. The hydrogenated gas oil is removed from separation zone 37 by way of line 41 from which it is directed to line 31 and returned to the catalytic cracking zone 13 as shown in the flow diagram. The liquid residue remaining after distillation of the gas oil is returned to the thermal cracking zone as shown.

In one specific embodiment, my invention comprises subjecting a wide range boiling hydrocarbon oil, such as a crude oil, to fractional distillation to separate gasoline, naphtha, gas oil, and a liquid residue, commingling said naphtha with a gasoline fraction obtained in a thermal cracking step hereinafter described, subjecting said mixture to a catalytic reforming process in the presence of hydrogen-containing gases to form a high octane substantially saturated gasoline, commingling the aforesaid gas oil with a recycle fraction obtained in a manner hereinafter set forth, subjecting said mixture to a catalytic cracking process, separating from the conversion products of said catalytic cracking process a motor fuel, and a higher boiling fraction, commingling said higher boiling fraction with the liquid residue obtained from the fractionation of the charging stock as hereinbefore set forth and with a liquid fraction obtained in a destructive hydrogenation step to be hereinafter described, and subjecting said mixture to a thermal cracking step, separating from the products of said thermal cracking step gasoline, naphtha, gas oil, and a liquid residue, commingling said gasoline with a naphtha fraction to form the combined feed for the catalytic reforming step as hereinbefore set forth, subjecting the naphtha produced in the thermal cracking step to a thermal reforming step to produce a high octane motor fuel, commingling the gas oil produced in the aforesaid thermal cracking step with the gas oil obtained from the distillation of the charging stock to form the combined feed for the catalytic cracking step as hereinbefore set forth, subjecting the liquid residue obtained from the thermal cracking step to destructive hydrogenation and separating the conversion products of said destructive hydrogenation step into normally gaseous products, gasoline, and a liquid residue and returning said liquid residue to the thermal step as hereinbefore set forth.

The process is illustrated in the accompanying flow diagram which shows the relationship between the various steps of the process. Crude oil is supplied to the system through line 1 which enters separation zone 2 wherein the oil is fractionated into its component fractions. Straight run gasoline of low end point, such as 300–350° F., is removed from line 3 and may constitute a product of the process. The naphtha fraction obtained in separation zone 2 is removed by way of line 4 from which it is directed to catalytic reforming zone 5. Hydrogen-containing gases or a hydrogen donor, such as a naphthenic oil, is supplied to line 4 through line 6. These hydrogen-containing gases may be process gases formed in the catalytic reforming step itself. The products from the catalytic reforming zone enter line 7 from which they pass to separation zone 8 from which normally gaseous products are removed by way of line 9, the gasoline by way of line 10 and the bottoms by way of line 11.

The gas oil obtained from the fractionation of the crude is removed from separation zone 2 by way of line 12 from which it enters catalytic cracking zone 13. The products leave the catalytic cracking zone by way of line 14 and enter separation zone 15 from which normally gaseous products are removed by way of line 16, the catalytically cracked gasoline by way of line 17 and a higher boiling fraction by way of line 18. The topped crude is removed from separation zone 2 by way of line 19 from which it is directed to thermal cracking zone 20. The conversion products from thermal cracking zone 20 enter line 21 and are directed to separation zone 22. Normally gaseous products are removed from separation zone 22 by way of line 23. A low boiling gasoline is removed from zone 22 by way of line 24 and is directed to line 4 where it becomes part of the combined feed for the catalytic reforming zone 5. The naphtha fraction formed in the thermal cracking process is removed from separation zone 22 by way of line 25 and is directed to thermal reforming zone 26. The conversion products from the thermal reforming zone 26 are removed by way of line 27 from which they are directed to separation zone 28 for separation into normally gaseous products which are removed by way of line 29, the thermally reformed gasoline which is removed by way of line 30 and heavy bottoms which are removed by way of line 31 and directed to line 12 where they become part of the combined feed for the catalytic cracking step. The higher boiling distillate having the order of volatility of a gas oil is removed from separation zone 22 by way of line 32 from which it is directed to line 31. As hereinbefore set forth, line 31 discharges into line 12 which in turn supplies a product to the catalytic cracking zone 13. The non-vaporous liquid residue separated from the conversion products of the thermal cracking zone in separation zone 22 is removed by way of line 33 from which it is directed to the hydrogenation zone 34. Hydrogen-containing gases used in the hydrogenation zone are supplied to line 33 by way of line 35. The products from the hydrogenation zone are removed by way of line 36 and directed to separation zone 37 from which normally gaseous products are removed by way of line 38, the gasoline by way of line 39 and the higher boiling liquid by way of line 40. The hydrogenated residue is directed from line 40 to line 19 where it becomes part of the combined feed for the thermal cracking step.

The following results are obtainable when processing a Mid-Continent crude of 40.2 A. P. I. gravity by the process of my invention. The total quantity of gasoline obtainable is equal to 74.5 volume per cent of the charging stock. This is distributed among the various steps as follows: 22% 300° end point gasoline is obtained by direct distillation. It has an octane number of 65 by the C. F. R. motor method. 28.5% gasoline having an octane number of 78 may be obtained from the catalytic reforming step. The catalytic cracking step will produce 15 volume per cent of an 80 octane number gasoline. The thermal reforming step produces 8 volume per cent of 75 octane number gasoline. The destructive hydrogenation step produces about 1 volume per cent of the saturated gasoline with an octane number of 50.

I claim as my invention:

1. A process for producing high octane motor fuel which comprises fractionating crude oil to form topped crude, gas oil and a lighter fraction containing a substantial quantity of low anti-knock gasoline hydrocarbons, catalytically reforming said lighter fraction, catalytically cracking said gas oil and separating resultant gas and gasoline from heavier conversion products, combining at least a portion of the latter with said topped crude, thermally cracking the resultant mixture at a temperature sufficient to convert a substantial portion of the mixture into gasoline, supplying gasoline products of the thermal cracking to the catalytic reforming step, supplying heavier distillate products of the thermal cracking to the catalytic cracking step, separating from the products of the thermal cracking a naphtha fraction boiling intermediate said gasoline products and said heavier distillate products, subjecting said naphtha fraction to thermal reforming, separating resultant reformed gasoline from heavier hydrocarbons and supplying at least a portion of the latter to the catalytic cracking step.

2. The process as defined in claim 1 further characterized in that residual products of the thermal cracking are subjected to hydrogenation to form hydrogenated gas oil and hydrogenated residue which are supplied, respectively, to the catalytic and thermal cracking steps.

3. The process as defined in claim 1 further characterized in that a hydrogen donor is introduced to the catalytic reforming step whereby to produce therein a gasoline of low bromine number.

4. The process as defined in claim 1 further characterized in that a hydrogen-containing gas is introduced to the catalytic reforming step whereby to produce therein a gasoline of low bromine number.

5. The process as defined in claim 1 further characterized in that a hydrogen donor comprising a naphthenic oil is introduced to the catalytic refoming step whereby to produce therein a gasoline of low bromine number.

JEAN DELATTRE SEGUY.